J. POMFRET, Sr.
LOCK BAR BARRIER FOR PROTECTING SHIPS AGAINST TORPEDO ATTACKS.
APPLICATION FILED OCT. 15, 1917.
1,273,664.
Patented July 23, 1918.
2 SHEETS—SHEET 1.
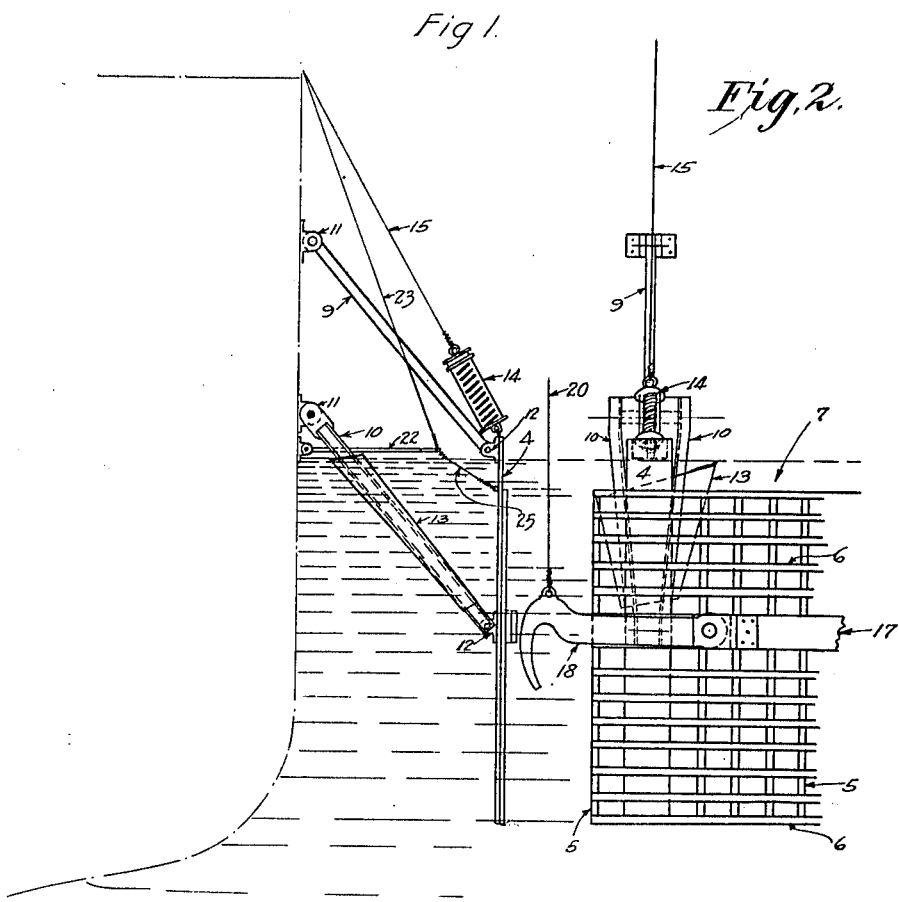

J. POMFRET, Sr.
LOCK BAR BARRIER FOR PROTECTING SHIPS AGAINST TORPEDO ATTACKS.
APPLICATION FILED OCT. 15, 1917.

1,273,664.

Patented July 23, 1918.
2 SHEETS—SHEET 2.

Witnesses
William H. Harrison
Andrew V. Brennan

Inventor:
John Pomfret, Sr.

UNITED STATES PATENT OFFICE.

JOHN POMFRET, SR., OF PATERSON, NEW JERSEY.

LOCK-BAR BARRIER FOR PROTECTING SHIPS AGAINST TORPEDO ATTACKS.

1,273,664. Specification of Letters Patent. Patented July 23, 1918.

Application filed October 15, 1917. Serial No. 196,683.

*To all whom it may concern:*

Be it known that I, JOHN POMFRET, Sr., a citizen of the United States, residing at Paterson, in the county of Passaic and State of New Jersey, have invented a new and useful Lock-Bar Barrier for Protecting Ships Against Torpedo Attacks, of which the following is a specification.

My invention relates to the construction of a lock-bar barrier for protecting ships against torpedo attack, with the means of attaching the barrier to a ship. The object of the invention is to provide a barrier which will intercept and cause a torpedo to explode before it reaches the hull of the ship, which barrier can be raised or lowered from the ship, together with the means of attaching the barrier to the ship so that it may be drawn through the water by the bow of the ship, the main strain being placed on the bow.

I attain these objects by the mechanism illustrated in the accompanying drawings, in which—

Figure 3:
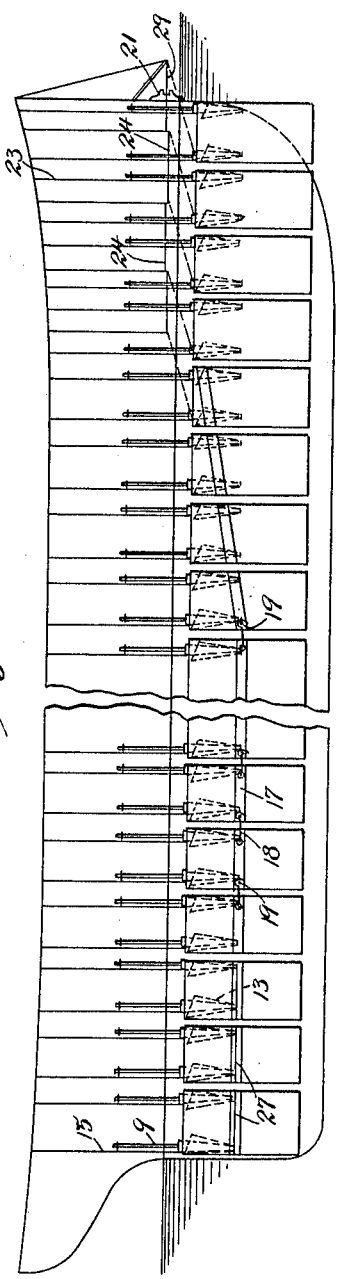
Figure 4:
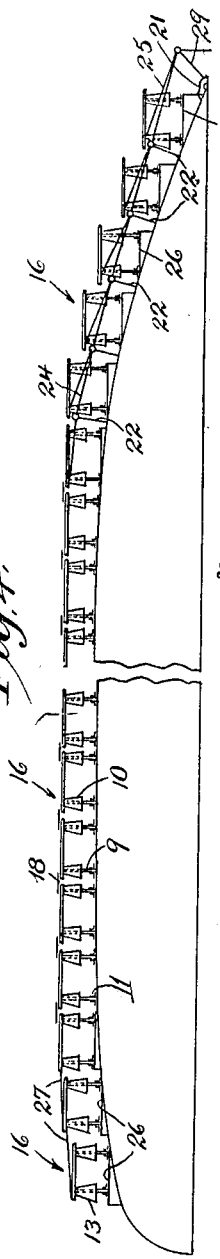
Figure 5:
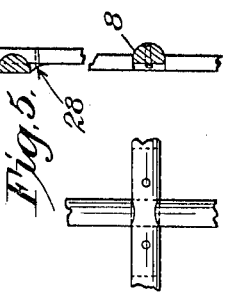

Figure 1 is a vertical section through the barrier and ship; Fig. 2 is a side elevation of one end of a barrier unit; Fig. 3 is a side elevation of the barrier as attached to the ship, showing the general arrangement; Fig. 4 is a top or plan view, showing the whole barrier and its attachment to the ship; Fig. 5 is the detail of the method of securing the barrier bars together, showing a side elevation and two end elevations showing one bar in section.

The barrier is made up of units, each unit being rectangular or square in shape, and composed of two vertical ellipsoidal columns (4) ellipsoidal vertical bars (5) and horizontal bars (6), placed so as to form a mesh or lattice-work (7) which will shed the water.

Each vertical bar has slots cut into its rounded side, through which the flat sides of the horizontal bars are slid (8), to form the unit of barrier, and each horizontal bar has fillets on it (28) at suitable intervals, so as to lock the vertical bars and secure a rigid structure.

Attached to each unit are two pivotal upper booms (9) and two pivotal lower booms (10) bracketed to the side of the ship at suitable points 11, and to the vertical columns of the unit at (12) so that the unit may be raised and lowered from the ship.

Each lower boom is provided with water shears (13) attached to and incasing the boom like a sheath, and with edges extending fore and aft. The forward edge of the shears is lowered at a suitable angle to the surface of the water, so as to act against the water like a plane, to keep the barrier from lifting out of the water when the ship is under weigh.

Each column has a spiral spring 14 at the top attached to a flexible cable (15) which in turn is connected to the deck of the ship by means of a snatch block or other suitable means not shown for raising and lowering the same by power from the fore or after part of the ship.

Each unit (16) runs parallel with the center line of the ship, and is placed at a suitable distance from the side of the ship. From the points where the sides of the ship converge to form the bow, the forward units are placed in echelon; and from the points where the sides of the ship converge to form the stern, the units are placed in echelon.

Each unit which runs parallel to the side of the ship has a sectional draw-bar 17 secured to the vertical columns and vertical bars. Each draw-bar section is provided with a hook 18 on the forward end and an eye 19 on the after end, so as to secure a continuous draw-bar when the units are joined. The hook is operated by a line 20 running through sheaves to the deck.

On the bow of the ship, as near as possible to the water line, a saddle 21 is provided with two or more built-up arms 29 extending forward of the bow and about thirty degrees from the center line of the ship, braced together and forming approximately an acute angle, to act as a drawgear for the barrier units.

From the saddle to the point where the side of the ship is parallel to the center line of the ship, pivotal arms 22 are placed at suitable intervals on the side of the ship, near the water line, supported by cables 23 from the deck of the ship. Cables 24 are run from the saddle arms, secured to these pivotal arms and attached to the sectional draw-bar nearest the bow.

Other cables 25 are attached to the forward units of the barrier and to the pivotal arms, or to the saddle arms, as may be desired.

From the bow, and following the contour of the ship, to the point where the side of the ship is parallel to the center line of the ship, right-angled brackets 26 are secured to the side of the ship to form foundations for the forward barrier units, the said forward barrier units being placed in echelon, following the contour of the bow.

The stern units are attached by cables 27 to the aft end of the draw-bar and are drawn in tandem fashion.

The whole invention provides an outer shell for the ship, which may be placed at any suitable distance from the ship; the barrier being so constructed as to be drawn mainly by the bow of the ship, and being built of steel or other suitable material.

I am aware that prior to my invention shields or protectors have been proposed or made, extending along the ship, and I do not, therefore, claim broadly for a shield; but

I claim—

1. A submersible lock-bar barrier, comprising a rectangular shape of vertical ellipsoidal columns, vertical ellipsoidal bars and horizontal bars, forming a mesh or lattice-work of suitable spacing, attached to brackets on the hull of the ship by two upper and two lower pivotal booms, substantially as specified; the vertical bars having slots cut into them, so as to permit them to slide on the horizontal bars, and being locked with fillets; water shears attached to the lower booms; cables and springs attached to each vertical column and connected to the deck of the ship by suitable means; a sectional draw-bar extending horizontally through the unit of barrier and having on the forward end an adjustable hook and on the after end an eye.

2. A submersible lock-bar barrier, composed of units, as specified, extending around the ship; each unit being attached to the ship and connected with suitable apparatus for raising and lowering, each unit having an adjustable hook and an eye for joining it to another unit, and all the units, except the bow and stern units, being joined together by the specified hooks and eyes, so as to form a continuous draw-bar secured to a saddle at the bow of the ship by cables; the forward or bow units being placed in echelon and connected to the pivotal arms; and the stern or aft units being placed tandem fashion and attached by cables to the after end of the draw-bar.

3. The means of attaching to the ship a barrier to protect ships from torpedo attack, substantially as specified; comprising a saddle with built-up arms at the bow of the ship; pivotal arms on the starboard and port sides of the bow, connected with the deck by cables; cables connecting with the saddle arms at the bow and the pivotal arms on the contour of the bow and thence to the draw-bar; a continuous sectional draw-bar passing through each unit of barrier between bow and stern, with hook and eye on each unit; cables secured to the pivotal arms on the contour of the bow and to the forward units of barrier; right-angled brackets secured to the starboard and port sides of the bow and stern; cables secured to the after end of the draw-bar and to the stern units.

JOHN POMFRET, Sr.

Witnesses:
WILLIAM E. BRENNAN,
ANDREW V. BRENNAN.

Copies of this patent may be obtained for five cents each, by addressing the "Commissioner of Patents, Washington, D. C."